(No Model.)
H. W. MILLER.
ELECTRIC METER.
No. 452,276. Patented May 12, 1891.
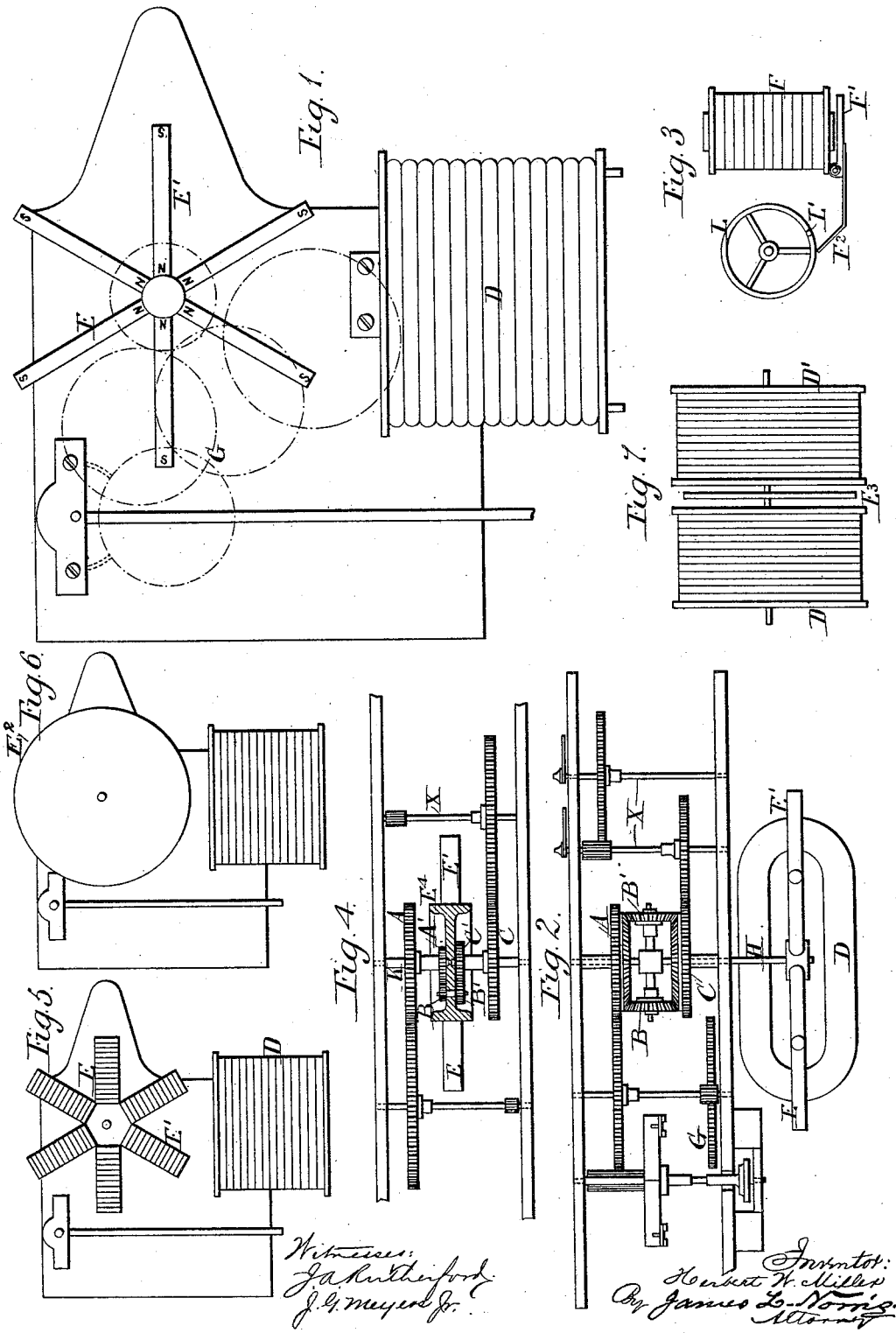

UNITED STATES PATENT OFFICE.

HERBERT W. MILLER, OF LONDON, ENGLAND.

ELECTRIC METER.

SPECIFICATION forming part of Letters Patent No. 452,276, dated May 12, 1891.

Application filed November 21, 1890. Serial No. 372,213. (No model.) Patented in England October 29, 1890, No. 17,327.

*To all whom it may concern:*

Be it known that I, HERBERT WOODVILLE MILLER, a citizen of England, residing at No. 2 York Mansions, Earl's Court, in the county of Middlesex, England, have invented a new and useful Improved Electric Meter,(for which I have obtained a patent in Great Britain, dated October 29, 1890, No. 17,327,) of which the following is a specification.

My invention relates to an electric meter wherein clock-work is so combined with a differential mechanism connected to a counter or registering mechanism and with an electrical circuit through which the current to be measured or a part thereof is made to flow that, according as a greater or less current is passing through the meter, the differential mechanism is made to impart a proportionately greater or less motion to the counter or registering mechanism. In such apparatus as heretofore constructed there have always been employed two distinct clock-work mechanisms, which have acted conjointly upon the differential mechanism, such clock-works being either driven independently, as in the Aron meter, or both clock-works are driven by the same spring, as in the Bulton-Edmondson meter. According to my invention I reduce both the first cost and the cost of maintenance of such meters by dispensing entirely with the one clock-work mechanism and arranging a single clock-work in such manner, in combination with differential mechanism actuating the counter or registering mechanism, that on one part of such differential mechanism being subject to the influence of the electric current to be measured, so as to have its motion retarded thereby, it is made to effect a proportionate movement of the counter, while when there is no supply of electric current passing through the instrument the said part of the differential mechanism moves freely without imparting any motion to the counter. The clock-work may be of any suitable known kind, driven either by weight, spring-power, or electricity, and it may be arranged so as to be either wound up by hand or automatically by electrical means.

The novel features of my invention will be hereinafter described and claimed, reference being made to the accompanying drawings, in which—

Figure 1 is a detail side view looking at the rear side of the instrument. Fig. 2 is a top plan view of the same. Fig. 3 is a detail side elevation of an electro-magnetic brake mechanism. Fig. 4 is a top plan view of a modified construction. Fig. 5 is a detail side view of an electro-magnet or solenoid to be used instead of permanent magnets. Fig. 6 is a detail side view showing a modification of the magnets or solenoids exhibited by Fig. 6, and Fig. 7 is a detail plan view of another modification of the electro-magnets or solenoids.

The clock-work G, which is of ordinary construction, drives the wheel A of the differential gear A B C continuously. The two bevel planet-wheels B B', which gear both with A and with the wheel C, consequently also revolve continuously both on their own axes and round the axis H, which passes through the hollow independent axes of A and C, and if their free rotation is not impeded they will roll upon C while this remains stationary. If, however, the wheels B B' be subject to a retarding action while A continues to be driven at a uniform speed, they will then cause the wheel C to revolve in the contrary direction to A at a speed which will be proportionate to the retarding action to which the wheels B are subjected, and C will impart this motion to the first-motion shaft of the counter X. For producing the said retarding action by means of the electric current to be measured the following arrangement is employed: On the shaft H, carrying the wheels B B', are fixed one or more permanent magnets E E', which consequently revolve continuously with the wheels B B' in front of one or more coils of wire D D, through which the current to be measured passes. When an electric current is passed through these coils, they exercise an attraction on the magnets E E', and thereby retard their rotation, and consequently also that of the wheels B B', so that the current to be measured or a part thereof being passed through the coils D the retarding effect, and consequently the movement of wheel C and counter X, will be proportional to the strength of the current.

In place of the permanent magnets E E' electro-magnets or solenoids may be used, as shown at Fig. 5, through which also the current to be measured or a portion thereof is passed, these parts being either put wholly in circuit with the main leads or in a shunt-circuit therefrom; or one or more of either the revolving coils E E' or the stationary coils D may be partly put in the main circuit and the other coils be connected as a shunt across the main leads; or, again, in place of permanent magnets electro-magnets or solenoids may be used. A soft-iron disk $E^2$, as at Fig. 6, which in being polarized, as it revolves opposite the coil D, will also have its rotation retarded; or a copper disk $E^3$ may be employed, situated between two solenoids or electro-magnets D D', as at Fig. 7, so that the lines of force passing from the magnets through the copper disk as it rotates will also tend to retard its motion.

It will also be evident that other forms of differential gear may be used, such as that shown at Fig. 4, where the wheel A, driven by the clock-work, as before, is connected by a tubular spindle to wheel A' and runs loose on the fixed spindle K.

B is a planet-wheel gearing with A' and carried by disk $E^4$, carrying the magnets E E' and running loose on K, E E' being subject to the action of a coil, as before. B' is a second planet-wheel on the same spindle as B and gearing with wheel C' on the hollow spindle of C, also loose on K, and which drives the counter-spindle X. When the magnets E E' do not have their rotation retarded, A A' will cause B' to revolve round C' without imparting motion to C; but when E E' $E^2$ are retarded by the action of the current flowing through the coil, B' will drive C C' round at a speed proportionate to the retarding action. An electro-magnetic brake or stopping mechanism may be provided for stopping the pendulum or balance-wheel of the clock when no current is passing through the meter. For this purpose the arrangement shown at Fig. 3 may be employed, in which an electro-magnet F, through the coils of which the whole or part of the current to be measured is made to pass, attracts an armature F', having a tail $F^2$, which is thereby held out of the path of a stud L' on the balance-wheel L, so that the clock-work is then free to act; but when no current is passing armature F' falls by its weight, and the tail $F^2$ projects into the path of the stud L', and thus arrests the clock-work.

Having thus described the nature of this invention and the best means I know of carrying the same into practical effect, I claim—

1. In an electric meter, the combination, with a counter or register, a single clock-work, and differential gear mechanism actuating the counter or register, of a coil arranged to receive the current to be measured or a portion thereof, and a rotating device connected with one gear of the differential gear mechanism and coacting with the coil to retard the differential gear mechanism and thereby render the movement of the counter or register proportional to the strength of the current, substantially as described.

2. In an electric meter, the combination, with a clock-work, a counter or register, and differential gear mechanism, of a rotating magnet connected with one gear of the differential gear mechanism and a coil arranged to receive the current to be measured or a portion thereof and acting to retard the rotation of the magnet, and thereby exert a retarding influence on the differential gear mechanism for rendering the movement of the counter or register proportional to the strength of the current, substantially as described.

3. In an electric meter, the combination, with a single clock-work mechanism, a counter or register, and a differential gear mechanism operated by the clock-work mechanism for actuating the counter or register, of an electro-magnet, solenoid, or coil which receives the current to be measured or a portion thereof and exerts a retarding influence on the rotating part of the differential gear mechanism to render the movement of the counter proportional to the strength of the current flowing through the electro-magnet, solenoid, or coil, substantially as described.

In testimony whereof I have signed my name to this specification, in the presence of two subscribing witnesses, this 11th day of November, A. D. 1890.

HERBERT W. MILLER.

Witnesses:
OLIVER IMRAY,
*Patent Agent, 28 Southampton Buildings, London, W. C.*
JNO. P. M. MILLARD,
*Clerk to Messrs. Abel & Imray, Consulting Engineers and Patent Agents, 28 Southampton Buildings, London, W. C.*